United States Patent
Lais et al.

(10) Patent No.: US 10,948,321 B2
(45) Date of Patent: Mar. 16, 2021

(54) SENSOR ASSEMBLY FOR A SENSOR, SENSOR, AND MEASURING SYSTEM FORMED THEREWITH

(71) Applicant: Endress + Hauser Flowtec AG, Reinach (CH)

(72) Inventors: Christian Lais, Munchenstein (CH); Andreas Strub, Weil am Rhein (DE); Dominique Wiederkehr, Hagenthal-le-bas (FR)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 615 days.

(21) Appl. No.: 15/507,350

(22) PCT Filed: Aug. 19, 2015

(86) PCT No.: PCT/EP2015/069046
§ 371 (c)(1),
(2) Date: Feb. 28, 2017

(87) PCT Pub. No.: WO2016/034417
PCT Pub. Date: Mar. 10, 2016

(65) Prior Publication Data
US 2017/0284841 A1 Oct. 5, 2017

(30) Foreign Application Priority Data
Sep. 1, 2014 (DE) ...................... 10 2014 112 558.4

(51) Int. Cl.
*G01F 1/32* (2006.01)
*G01F 15/16* (2006.01)

(52) U.S. Cl.
CPC .......... *G01F 1/3254* (2013.01); *G01F 1/3209* (2013.01); *G01F 15/16* (2013.01)

(58) Field of Classification Search
CPC .............................. G01F 1/3254; G01F 1/3209
(Continued)

(56) References Cited

U.S. PATENT DOCUMENTS

| 4,791,818 | A | | 12/1988 | Wilde | |
|---|---|---|---|---|---|
| 5,343,762 | A | * | 9/1994 | Beulke | ................. G01F 1/3218 73/861.24 |

(Continued)

FOREIGN PATENT DOCUMENTS

| CN | 1086598 A | 5/1994 |
|---|---|---|
| DE | 4122799 A1 | 1/1993 |

(Continued)

OTHER PUBLICATIONS

German Search Report, German Patent Office, Munich, DE—dated May 18, 2015.

(Continued)

*Primary Examiner* — Tarun Sinha
(74) *Attorney, Agent, or Firm* — Bacon & Thomas, PLLC

(57) ABSTRACT

The sensor assembly comprises: a bowl shaped, namely at least sectionally dished, membrane, with a curved surface and an oppositely lying surface; and a sensor blade extending from curved surface of the membrane. The membrane is so formed that at least one region of the curved surface adjoining the sensor blade is convex. A sensor formed by means of such a sensor assembly and by means of a transducer element coupled therewith and serving for generating a sensor signal representing movements of the sensor blade changing as a function of time and/or deformations of the membrane changing as a function of time, or a measuring system formed by means of the sensor and a measuring electronics connected thereto, can be used for registering (Continued)

pressure fluctuations in a flowing fluid, such as, for instance, a 400 C hot steam, for instance, in order to measure a flow parameter of the fluid.

2 Claims, 6 Drawing Sheets

(58) Field of Classification Search
USPC .................................................. 73/514.11
See application file for complete search history.

(56) References Cited

U.S. PATENT DOCUMENTS

| | | | |
|---|---|---|---|
| 2006/0230841 | A1 | 10/2006 | Shrikrishna |
| 2011/0154913 | A1 | 6/2011 | Konyukhov et al. |
| 2015/0369376 | A1* | 12/2015 | Gille ................. G01F 1/28 |
| | | | 73/198 |

FOREIGN PATENT DOCUMENTS

| DE | 4419172 | A1 | 12/1995 |
|---|---|---|---|
| DE | 29900479 | U1 | 3/1999 |
| DE | 102007030690 | A1 | 5/2009 |
| DE | 102008054915 | A1 | 6/2010 |
| DE | 10 2013 002118 | A1 | 8/2014 |
| DE | 102013913476 | A1 | 2/2015 |
| DE | 102013110243 | A1 | 4/2015 |
| DE | 102014112558 | A1 | 3/2016 |
| EP | 0841545 | A1 | 5/1998 |
| WO | WO8902580 | A1 | 3/1989 |
| WO | WO9408211 | A1 | 4/1994 |
| WO | WO0009973 | A1 | 2/2000 |
| WO | WO2004081500 | A2 | 9/2004 |

OTHER PUBLICATIONS

International Search Report, EPO, the Netherlands—dated Dec. 11, 2015.
English Translation of the International Preliminary Report on Patentability, WIPO, Geneva, CH,—dated Mar. 16, 2017.
Chinese Office Action in corresponding Chinese Application No. 201580047051.2, dated Jan. 16, 2019.
Chinese Office Action dated Nov. 4, 2020, in corresponding Chinese Application (copy not attached).

* cited by examiner

SENSOR ASSEMBLY FOR A SENSOR, SENSOR, AND MEASURING SYSTEM FORMED THEREWITH

TECHNICAL FIELD

The invention relates to a sensor assembly having a membrane and a sensor blade extending from a surface of the membrane. Furthermore, the invention relates to a sensor formed by means of such a sensor assembly, respectively a measuring system formed therewith, respectively its use for registering pressure fluctuations in a flowing fluid.

BACKGROUND DISCUSSION

Used often in process measurements- and automation technology for measuring flow velocities of fluids flowing in pipelines, especially rapidly flowing and/or hot gases and/or fluid flows of high Reynolds number (Re), respectively volume- or mass flow rate corresponding to a respective flow velocity (u), are measuring systems embodied as vortex flow measuring devices. Examples of such measuring systems are known from, among others, US-A 2006/0230841, US-A 2008/0072686, US-A 2011/0154913, US-A 2011/0247430, U.S. Pat. Nos. 6,003,384, 6,101,885, 6,352,000, 6,910,387 or 6,938,496 and are also sold by the applicant, for example, among others, under the designations "PROW-IRL D200", "PROWIRL F200", "PROWIRL O200", "PROWIRL R200" (http://www.de.endress.com/#products/prowirl).

These measuring systems have, protruding into the lumen of the respective pipeline, for example, a pipeline in the form of a component of a heat supply grid or a turbine circuit, or into a lumen of a measuring tube installed in the course of the pipeline, consequently flowed against by the fluid, a bluff body for producing, within the volume portion of the fluid flow flowing directly downstream of the bluff body, vortices lined up to form a so-called Kármán vortex street. The vortices are, in such case, as is known, generated with a shedding rate ($1/f_{Vtx}$) from the bluff body dependent on the flow velocity. Furthermore, the measuring systems have, integrated into the bluff body, or connected with such or located downstream of the same, namely in the region of the Karman vortex street and protruding into the flow, consequently into the lumen of the pipeline or measuring tube, a sensor, which serves to register pressure fluctuations in the Karman vortex street formed in the flowing fluid and to transduce such into a sensor signal representing the pressure fluctuations, namely to deliver a signal, for example an electrical or optical signal, which corresponds to a pressure reigning within the fluid and subjected, as a result of opposing vortices downstream of the bluff body, to periodic fluctuations, or to deliver a signal having a signal frequency ($\sim f_{Vtx}$) corresponding to the shedding rate of the vortices.

The sensor comprises a sensor assembly formed by means of a thin, essentially flat membrane and a sensor blade, most often a rod shaped, plate shaped or wedge shaped, sensor blade extending from an essentially planar surface of the membrane, and adapted to register pressure fluctuations in the Kármán vortex street, namely to convert such into movements of the membrane corresponding to the pressure fluctuations. The membrane includes an external edge segment, most often an annular external edge segment, which is adapted to be connected hermetically sealedly, for example, by material bonding, to a seat serving for mounting the membrane to a wall of a tube, in such a manner that the membrane covers, respectively hermetically seals, an opening provided in the wall of the tube and that the surface of the membrane carrying the sensor blade faces the lumen of the measuring tube, or the pipeline, guiding the fluid, consequently that the sensor blade protrudes inwardly into the lumen. The membrane is so formed that at least one membrane thickness, measured as a minimal thickness of an inner membrane segment, bounded by the outer edge segment, is very much less than a membrane diameter, measured as a greatest diameter of a segment area bounded by the outer edge. In order to achieve an as high as possible measuring sensitivity, namely an as high as possible sensitivity of the sensor to the pressure fluctuations to be registered and at the same time an as high as possible mechanical eigenfrequency for the bending oscillation mode of the sensor assembly forced by the pressure fluctuations, namely an eigenfrequency lying above the highest shedding rate to be measured, membranes of established measuring systems have typically a diameter to thickness ratio lying, for instance, in the order of magnitude of 20:1. As, among others, shown in the above mentioned U.S. Pat. No. 6,352,000, sensor assemblies of the above described type can, at times, additionally have a compensating body extending from a surface of the membrane opposite from the surface carrying the sensor blade, most often a rod, plate or shell shaped, compensating body, which serves, especially, to compensate forces, or moments, resulting from movements of the sensor assembly, for example, as a result of vibrations of the pipeline, respectively to prevent undesired movements of the sensor blade resulting therefrom.

For the purpose of generating the sensor signal, the sensor comprises, furthermore, a corresponding transducer element, for example, one formed by means of a capacitor mechanically coupled with the sensor assembly, or integrated therein, or by means of a piezo-stack serving as piezoelectric transducer, and typically adapted to register movements of the membrane, or of the, in given cases, present, compensating body and to modulate such onto an electrical or optical carrier signal.

The sensor assembly, or the sensor formed therewith, is connected on the side facing away from the fluid guiding lumen, furthermore, with a transmitter electronics, which is typically pressure- and shock resistantly encapsulated and, in given cases, also outwardly hermetically sealed. Transmitter electronics of industrial grade measuring systems usually have a corresponding digital measuring circuit electrically connected with the transducer element (in given cases, with interposed electrical barriers and/or galvanic separation locations) for processing the at least one sensor signal produced by the transducer element and for producing digital measured values for the measured variable to be registered, namely the flow velocity, the volume flow rate and/or the mass flow rate. The transmitter electronics of industrially usable measuring systems, or measuring systems established in industrial measurements technology, are accommodated usually in a protective housing of metal and/or shock resistant, synthetic material and have additionally most often also external interfaces conforming to an industrial standard, for example, DIN IEC 60381 1, for communication with superordinated measuring- and/or control systems formed, for example, by means of programmable logic controllers (PLC). Such an external interface can be embodied, for example, as a two-conductor connection insertable into an electrical current loop and/or compatible with established industrial fieldbusses.

Particularly due to the measurement principle related, relatively high diameter to thickness ratios of the membrane, conventional sensors of the type being discussed—in the case of use of a high strength, nickel based alloy, such as e.g. Inconel 718 (Special Metals Corp.), as membrane material—have most often a pressure resistance, namely a maximum permitted operating pressure, above which a non-reversible plastic deformation of the sensor or even a bursting of the membrane is a worry, i.e. a maximum operating pressure, which can be too low for the extremely high pressures, or pressure surges, at times, actually occurring in certain applications, or such sensors have for such uses a too unfavorable dependence of the pressure resistance on the operating temperature (pressure temperature curve), in such a manner that, for example, for operating pressures above 140 bar occurring in actually predestined hot steam applications with steam temperatures of above 400 C, at times, for example, as a result of so called condensation induced water hammering (CIWH condensation induced water hammers), a destruction free resistance can no longer be assured, or a use of a conventional measuring system of the type being discussed is not permissible due to pertaining laws and regulations, such as e.g. guideline 97/23/EH, 14. ProdSV, ASME U-Stamp or other pressure device guidelines.

SUMMARY OF THE INVENTION

Based on the above, an object of the invention is to improve the construction of sensor assemblies of the type being discussed, or sensors formed therewith, such that, as a result, they have a higher pressure resistance, or a dependence of the pressure resistance on the operating temperature enabling also use in hot steam applications with steam temperatures of above 400 C and pressure spikes of above 140 bar.

For achieving the object, the invention resides in a sensor assembly for a sensor, for example, for a sensor for registering pressure fluctuations in a Kármán vortex street formed in a flowing fluid, which sensor assembly comprises a bowl shaped, namely at least sectionally dished, membrane with a curved, first surface and an oppositely lying, second surface, for example, a likewise curved, second surface and/or a second surface at least partially parallel, and/or at least partially non-parallel, to the first surface, and a sensor blade extending from the first surface of the membrane, for example, a rod shaped or plate shaped or wedge shaped, sensor blade, wherein the membrane is so formed that at least one region of the first surface adjoining the sensor blade is convex.

Moreover, the invention resides in a sensor for registering pressure fluctuations in a flowing fluid, especially for registering pressure fluctuations in a Kármán vortex street formed in the flowing fluid, which sensor comprises such a sensor assembly and a transducer element for generating a sensor signal, for example, an electrical or optical, sensor signal, representing movements of the sensor blade changing as a function of time, for example, movements, which are at least at times periodic, and/or deformations of the membrane changing as a function of time, for example, deformations, which are at least at times periodic.

Furthermore, the invention resides in a measuring system for measuring at least one flow parameter, especially a flow parameter varying as a function of time, such as e.g. a flow velocity and/or a volume flow rate, of a fluid flowing in a pipeline, which measuring system comprises such a sensor for registering pressure fluctuations in the flowing fluid, for example, for registering pressure fluctuations in a Kármán vortex street formed in the flowing fluid, and a measuring-electronics, which is adapted to receive the sensor signal and to process such, for example, to generate measured values representing the at least one flow parameter.

A further aspect of the invention resides in using an aforementioned measuring system for measuring a flow parameter, for example, a flow velocity and/or a volume flow rate and/or a mass flow rate, of a fluid, such as e.g. a vapor, flowing in a pipeline, for example, a vapor having a temperature greater than 400° C. and/or acting on the membrane of the sensor with a pressure greater than 140 bar.

In a first embodiment of the sensor assembly, the membrane is so formed that the region of the first surface adjoining the sensor blade is aspherical.

In a second embodiment of the sensor assembly, the membrane is so formed that the region of the first surface adjoining the sensor blade is axially symmetric relative to at least one imaginary axis of symmetry, for example, in such a manner that the symmetry axis is parallel to a principle axis of inertia of the sensor blade and/or in such a manner that the symmetry axis is perpendicular to a principle axis of inertia of the sensor blade.

In a third embodiment of the sensor assembly, the membrane is so formed that the region of the first surface adjoining the sensor blade is axially symmetric relative to exactly two imaginary axes of symmetry, which are perpendicular to one another, for example, in such a manner that at least one of the axes of symmetry is parallel to a principle axis of inertia of the sensor blade and/or in such a manner that a principle axis of inertia of the sensor blade is perpendicular to one of the imaginary axes of symmetry and parallel to the other imaginary axis of symmetry.

In a fourth embodiment of the sensor assembly, the membrane is so formed that the region of the first surface adjoining the sensor blade is rotationally symmetric, by way of example, namely, spherical.

In a fifth embodiment of the sensor assembly, it is provided that a segment of the membrane carrying the sensor blade has a first zone forming a center of the membrane and having a first thickness and a second zone adjoining the first zone, for example, surrounding the first zone, and having a second thickness differing from the first thickness, for instance, in such a manner that the first thickness is less than the second thickness.

In a sixth embodiment of the sensor assembly, the membrane is so formed that at least one region of the second surface lying opposite the region of the first surface adjoining the sensor blade is concave.

In a seventh embodiment of the sensor assembly, the membrane is so formed that a membrane height, measured as a minimum separation of a center of area of the first surface from an imaginary projected area inscribed by a peripheral outer edge of the region of the first surface adjoining the sensor blade is less than a membrane diameter, measured as a greatest diameter of the projected area, for example, less than a greatest semi axis, or a radius, of the projected area; this, for example, also in such a manner that a diameter to-height ratio of the membrane, defined as a ratio of the membrane diameter to the membrane height is less than 30 and/or greater than 2, and/or in such a manner that a ratio of the membrane diameter to a length of the sensor blade, measured as the minimum separation between a proximal end of the sensor blade, namely an end adjoining the membrane, and a distal end of the sensor blade remote namely from the membrane, or its surface, amounts to less than 2 and/or greater than 0.5.

In an eighth embodiment of the sensor assembly, it is provided that the membrane is at least partially conical.

In a ninth embodiment of the sensor assembly, the membrane is so formed that at least the region of the first surface adjoining the sensor blade corresponds to a surface of a spherical zone, for example, in such a manner that a top area of the spherical zone corresponds to a cross sectional area of the sensor blade.

In a tenth embodiment of the sensor assembly, the membrane is so formed that at least the region of the first surface adjoining the sensor blade corresponds to a lateral surface of a frustum.

In an eleventh embodiment of the sensor assembly, the membrane is so formed that at least the region of the first surface adjoining the sensor blade corresponds to a segment of a surface of an ellipsoid.

In a twelfth embodiment of the sensor assembly, it is provided that sensor blade and membrane are so positioned and oriented relative to one another that a principle axis of inertia of the sensor blade is parallel to or coincides with a principle axis of inertia of the sensor assembly.

In a thirteenth embodiment of the sensor assembly, it is provided that sensor blade and membrane are so positioned and oriented relative to one another that a principle axis of inertia of the membrane, when lengthened, extends parallel to a principle axis of inertia of the sensor assembly, for example, coincides therewith.

In a fourteenth embodiment of the sensor assembly, it is provided that the membrane is composed, at least partially, for example, also predominantly or completely, of a metal, such as e.g. a stainless steel, or a nickel based alloy.

In a fifteenth embodiment of the sensor assembly, it is provided that the sensor blade is composed, at least partially, for example, also predominantly or completely, of a metal, such as e.g. a stainless steel, or a nickel based alloy.

In a sixteenth embodiment of the sensor assembly, it is provided that membrane and sensor blade are of the same material.

In a seventeenth embodiment of the sensor assembly, it is provided that membrane and sensor blade components are one and the same, monolithic, molded part, for example, one cast or manufactured by 3D laser melting.

In an eighteen embodiment of the sensor assembly, it is provided that membrane and sensor blade are connected with one another by material bonding, especially welded, or soldered or brazed.

In a nineteenth embodiment of the sensor assembly, the membrane includes an external edge segment, for example, an annular external edge segment and/or one equipped with a sealing surface. Developing this embodiment of the invention further, the outer edge segment is adapted to be connected, for example, by material bonding and/or hermetically sealedly, with a seat serving for mounting the membrane to a wall of a tube, for instance, in such a manner that the membrane covers, especially hermetically seals, an opening provided in the wall of the tube and/or in such a manner that the first surface of the membrane is facing a lumen of the tube, so that the sensor blade protrudes inwardly into the lumen. Alternatively or supplementally, at least one sealing surface, for example, a surrounding and/or circular ring like, sealing surface, can be embodied in the outer edge segment and/or the outer edge segment can form a peripheral outer edge of the convex region of the first surface adjoining the sensor blade.

In a first further development of the sensor assembly, such additionally comprises: a compensating body extending from the second surface of the membrane, for example, a rod-shaped or plate-shaped or sleeve-shaped, compensating body, for compensating forces and/or moments resulting from movements of the sensor assembly.

In a first embodiment of the first further development of the sensor assembly, it is provided that at least one region of the second surface adjoining the compensating body is concave.

In a second embodiment of the first further development of the sensor assembly, it is provided that membrane and compensating body are connected with one another by material bonding, for example, welded, or soldered or brazed.

In a third embodiment of the first further development of the sensor assembly, it is provided that sensor blade and compensating body are arranged aligned with one another.

In a fourth embodiment of the first further development of the sensor assembly, the membrane is so formed that the region of the second surface adjoining the compensating body is rotationally symmetric.

In a fifth embodiment of the first further development of the sensor assembly, compensating body and membrane are so positioned and oriented relative to one another that a principle axis of inertia of the membrane, when lengthened, extends parallel to a principle axis of inertia of the compensating body, especially coincides therewith.

In a sixth embodiment of the first further development of the sensor assembly, it is provided that sensor blade, compensating body and membrane are so positioned and oriented relative to one another that a principle axis of inertia of the sensor assembly is parallel both to a principle axis of inertia of the sensor blade as well as also to a principle axis of inertia of the compensating body, as well as also to a principle axis of inertia of the membrane, or the principle axis of inertia of the sensor assembly coincides both with the principle axis of inertia of the sensor blade as well as also with the principle axis of inertia of the compensating body, as well as also with the principle axis of inertia of the membrane.

In a seventh embodiment of the first further development of the sensor assembly, it is provided that the membrane and compensating body components are one and the same, monolithic, molded part, for example, in such a manner that sensor blade, membrane and compensating body are components of the molded part.

In an eighth embodiment of the first further development of the sensor assembly, it is provided that the compensating body is composed at least partly, by way of example also predominantly or completely, of a metal, such as e.g. a stainless steel, or a nickel based alloy.

In a ninth embodiment of the first further development of the sensor assembly, it is provided that membrane and compensating body are of the same material, for example, also in such a manner that sensor blade, membrane and compensating body are of the same material.

In a first further development of the measuring system, such additionally comprises: a tube insertable into the course of the pipeline and having a lumen, which is adapted to guide the fluid flowing in the pipeline.

In a first embodiment of the first further development of the sensor assembly, the sensor blade has a length, measured as the minimum separation between a proximal end of the sensor blade, namely an end adjoining the membrane, and a distal end of the sensor blade, namely an end remote from the membrane, or from its surface, which length corresponds to less than 95% of a caliber of the tube and/or greater than half the caliber.

In a second embodiment of the first further development of the sensor assembly, there is embodied in the wall of the tube an opening, for example, an opening also having a seat serving for the mounting of the membrane to the wall, and the sensor is inserted into the opening in such a manner that the membrane covers the opening, for example, hermetically seals the opening, and that the first surface of the membrane faces the lumen of the tube, so that the sensor blade protrudes inwardly into the lumen. Developing this embodiment of the invention further, it is, additionally, provided that the opening has a seat serving for mounting of the membrane to the wall, in which seat at least one sealing surface is embodied, for example, a surrounding and/or circular ring like, sealing surface. The membrane can, in such case, additionally have an external edge segment, for example, an annular, external edge segment, in which at least one sealing surface is embodied, for example, a surrounding and/or circular ring like, sealing surface, wherein the sealing surface and the sealing surface of the seat are adapted to close, or to seal hermetically, the opening, in given cases, also with interpositioning of at least one seal.

In a second further development of the measuring system, such additionally comprises: a bluff body arranged in the lumen of the tube and adapted to bring about a Kármán vortex street in the flowing fluid.

A basic idea of the invention is to bring about the desired high nominal pressure resistance for the sensor assembly of the invention, not least of all also at high operating temperatures of above 400° C., or the desired improving of the dependence of the pressure resistance of the sensor assembly on the operating temperature (pressure temperature curve of the sensor assembly) by embodying the membrane bowl shaped—in contrast to the essentially flat membranes of conventional sensor assemblies and, moreover, by rearranging it in such a manner that the surface carrying the sensor blade is convex, namely is bent out in the direction of the sensor blade, at least in the region adjoining the sensor blade.

An advantage of the invention is, among others, that therewith not only in very easy manner a considerable improvement of the nominal pressure resistance, or the pressure temperature curve, of sensors of the type being discussed can be achieved, but, also, that this is achieved, without thereby mentionably lessening the measuring sensitivity, namely the sensitivity of the sensor to the pressure fluctuations actually to be registered. A further advantage of the invention is also that the sensor assembly of the invention, apart from the shape of the membrane, can, in principle, be constructed in the same manner used for known sensor assemblies of conventional sensors, or measuring systems formed therewith. Moreover, the membrane of the sensor assembly of the invention can also be manufactured of the same materials as used for conventional membranes, consequently the manufacturing, or incremental, costs of the sensor assembly of the invention, for instance, lie in the order of magnitude of the costs of conventional sensor assemblies of the type being discussed.

The invention and advantageous embodiments thereof will now be explained in greater detail based on examples of embodiments shown in the figures of the drawing. Same, respectively equally acting or equally functioning, parts are provided in all figures with equal reference characters; when perspicuity requires or it otherwise appears sensible, already mentioned reference characters are omitted in subsequent figures. Other advantageous embodiments or further developments, especially also combinations, first of all, of only individually explained aspects of the invention, will become evident, furthermore, from the figures of the drawing and/or from claims. The figures of the drawing show as follows.

DETAILED DISCUSSION IN CONJUNCTION WITH THE DRAWINGS

Figure 1:
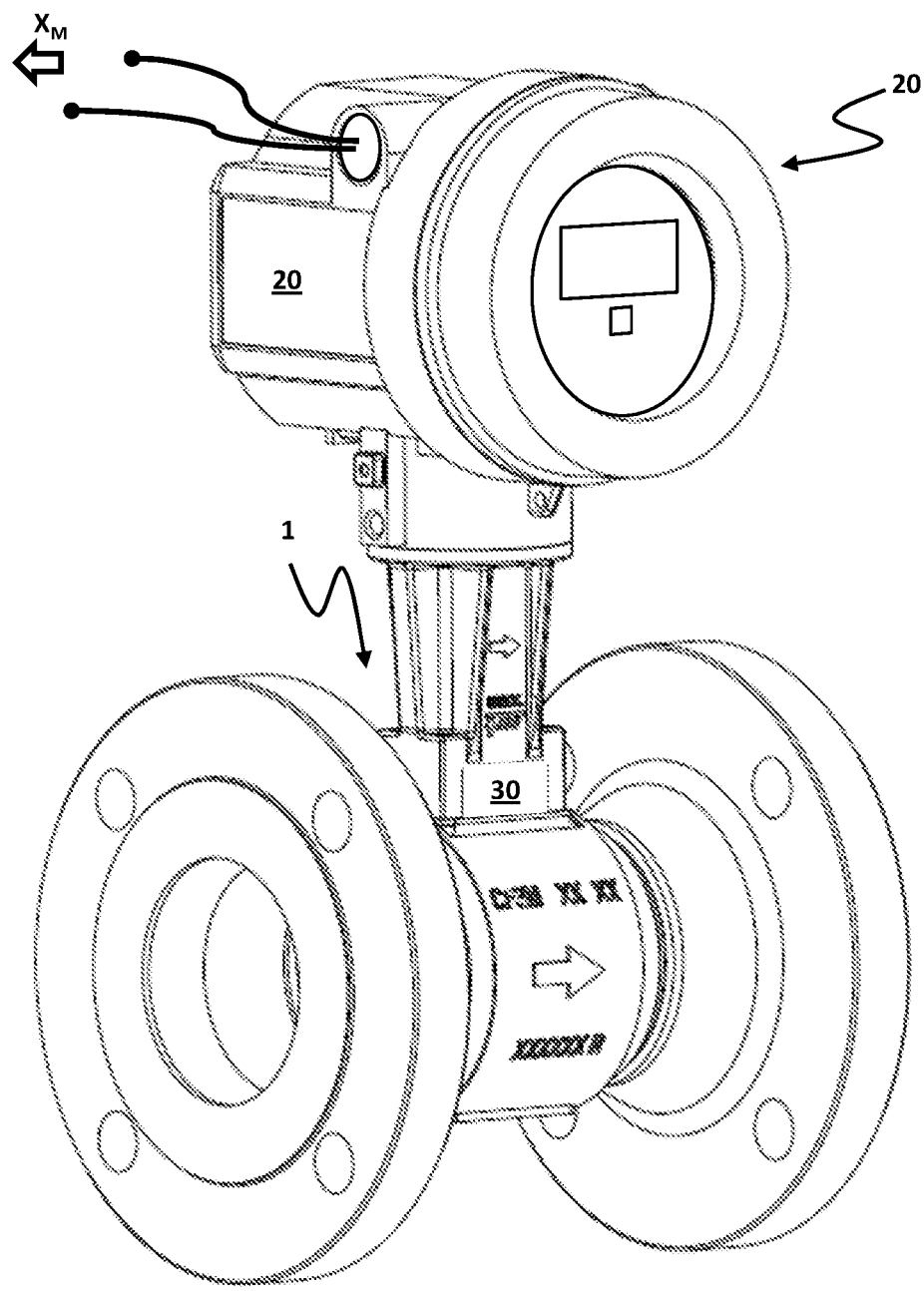
FIGS. 1, and 2 show schematically in different views, a measuring system (here embodied as a vortex flow measuring device) with a sensor and a measuring electronics for measuring at least one flow parameter of a fluid flowing in a pipeline.
Figure 2:
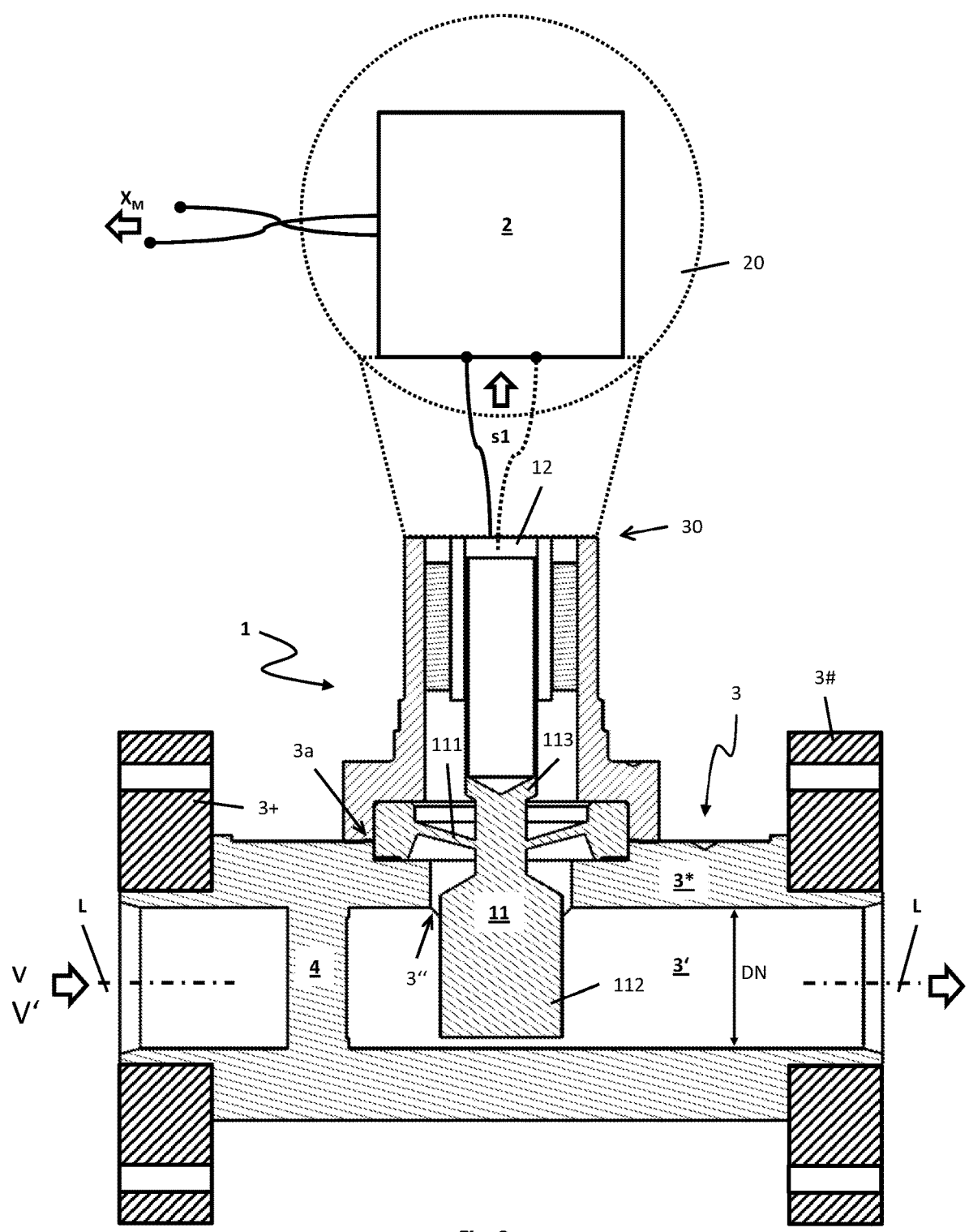

FIGS. 1 and 2 show an example of an embodiment of a measuring system for measuring at least one flow parameter, in given cases, also a flow parameter varying as a function of time, such as e.g. a flow velocity v and/or a volume flow rate V', of a fluid flowing in a pipeline, for example, a hot gas, especially one having a temperature greater than 400° C., and/or at least at times under a high pressure, especially of greater than 140 bar. The pipeline can be embodied, for example, as a plant component of a heat supply network or a turbine circulatory system; consequently the fluid can, for example, be steam, especially also saturated steam or superheated steam. The fluid can, however, for example, also be a (compressed) natural- or biogas, consequently the pipeline can, for example, also be a component of a natural- or biogas plant or a gas supply grid.

The measuring system includes a sensor 1, which is provided, or is embodied, to register pressure fluctuations in the flowing fluid and to transduce such into a sensor signal s1, for example, an electrical or optical, sensor signal, corresponding to the pressure fluctuations. As evident from the combination of FIGS. 1 and 2, the measuring system comprises, furthermore, a measuring electronics 2, for example, one accommodated in a pressure—and/or shock resistant, protective housing 20, which is connected to the sensor 1, or communicates with the sensor 1 during operation of the measuring system. Measuring electronics 2 is, especially, adapted to receive and to process the sensor signal s1, for example, to generate measured values $X_M$ representing the at least one flow parameter, for example, thus the flow velocity v, or the volume flow rate V'. The measured values $X_M$ can, for example, be visualized on-site and/or transmitted, by wire via connected fieldbus and/or wirelessly per radio, to an electronic data processing system, for instance, a programmable logic controller (PLC) and/or a process control station. The protective housing 20 for measuring electronics 2 can be made, for example, of a metal, for instance, a stainless steel or aluminum, and/or produced by means of a casting method, such as e.g. an investment casting- or a pressure casting method (HPDC); it can, however, for example, also be formed by means of a plastic molded part manufactured in an injection molding process.

Sensor 1 comprises, as also shown in FIG. 2 and FIGS. 3a, 3b, 3c, 3d, or as directly evident from a combination of these figures, a sensor assembly 11, which is formed by means of a membrane 111 and a sensor blade 112 extending from a first surface 111+ of the membrane 111. Sensor blade 112 has a wedge shape in the example of an embodiment shown here; it can, however, for example, also be embodied rod- or plate shaped, such as quite usual in the case of such sensors. Membrane 111 and sensor blade 112 can, for example, be components of one and the same, monolithic, molded part, which is, for example, cast or produced by 3D laser melting; membrane and sensor blade can, however, also be produced, first of all, separately from one another, embodied as individual parts, and then subsequently be connected with one another by material bonding, for example, welded, or soldered or brazed, such that, consequently, the individual parts are of materials correspondingly connectable with one another by material bonding. The membrane can, such as quite usual in the case of such sensor assemblies, be at least partially, for example, predominantly or completely, of a metal, such as e.g. stainless steel, or a nickel based alloy. Likewise the sensor blade can also be, at least partially, of a metal, for example namely a stainless steel, respectively a nickel based alloy; especially, membrane and sensor blade can also be produced of the same material.

Besides the sensor assembly 11, the sensor comprises, furthermore, a transducer element 2 (or electronics 2) embodied, for example, as a piezoelectric transducer, as a capacitive transducer embodied as a component of a capacitor, or, for example, also an optical transducer embodied as a component a photodetector, for generating a signal here serving also as a sensor signal and representing movements of the sensor blade, respectively, equally, deformations of the membrane, changing as a function of time, typically at least at times periodically as a function of time, for example, a signal in the form of a variable electrical voltage modulated by such movements or correspondingly modulated, laser light.

In an additional embodiment of the invention, the measuring system comprises, furthermore, a tube 3 insertable into the course of the previously indicated pipeline. Tube 3 has a lumen 3' surrounded by a wall 3* of the tube, for example, a metal wall 3*, which extends from an inlet end 3+ to an outlet end 3# and which is adapted to guide the fluid flowing in the pipeline. In the example of an embodiment shown here, there is provided on the inlet end 3+, as well as also on the outlet end 3#, in each case, a flange serving for forming a leakfree flange connection with, in each case, a corresponding flange on an inlet-, or outlet side, line segment of the pipeline. Furthermore, the tube 3 is here essentially straight, for example, embodied as a hollow cylinder with circularly shaped cross section, in such a manner that the tube 3 has an imaginary straight longitudinal axis L imaginarily connecting the inlet end 3+ and the outlet end 3#. The sensor 1 is inserted externally through an opening 3" formed in the wall into the lumen of the tube and in the region of the opening affixed, for example, releasably, externally on the wall 3*, and, indeed, in such a manner that the surface 111+ of the membrane 111 is facing the lumen 3' of the tube 3, so that the sensor blade 112 protrudes inwardly into the lumen. Especially, the sensor 1 is so inserted into the opening 3" that the membrane 111 covers the opening 3", or hermetically seals it. The opening can, for example, be so embodied that it such as quite usual in the case of measuring systems of the type being discussed has an (inner-) diameter, which lies in a range between 10 mm and about 50 mm.

In an additional embodiment of the invention, there is embodied in the opening 3" a seat 3a serving for the mounting of the membrane to the wall 3*. Sensor 1 can, in such case, be affixed to the tube 3, for example, by material bonding, especially by welding or soldering or brazing, of membrane 111 and wall 3*; it can, however, for example, also be connected releasably with the tube 3, for example, screwed, or screwed on. Embodied in the seat 3a, furthermore, can be at least one sealing surface, for example, also a surrounding, or circular ring like, sealing surface, which is adapted, in cooperation with the membrane 111 and an, in given cases, provided, for example, annular or washer-shaped, sealing element, correspondingly to seal the opening 3". Particularly for the above-described case, in which the sensor assembly is inserted into seat 3a, or that the membrane 111 is to be connected by material bonding with the wall of the tube 3, the membrane 111 includes, according to an additional embodiment of the invention, an external, for example, essentially annular, edge segment 111a having a thickness ta, which such as indicated in FIG. 2, or 3a, 3b, 3c, 3d—is significantly greater than a minimum thickness tb of an inner segment 111b surrounded by the edge segment 111a and carrying the sensor blade 112. Edge segment 111a can in advantageous manner, furthermore, be provided with a sealing surface, for example, a sealing surface also corresponding to the sealing surface, in given cases, provided in the opening 3" and/or a circular ring like, sealing surface.

In the example of an embodiment shown here, the measuring system is especially embodied as a vortex flow measuring device having a bluff body 4 arranged in the lumen of the tube 3—here namely upstream of the sensor 1—and serving to cause the appearance of a Karman vortex street in the flowing fluid. Sensor and bluff body are, in such case, especially, so dimensioned and arranged that the sensor blade 112 protrudes inwardly into the lumen 3* of the tube, or the fluid guided therein, into a region, which during operation of the measuring system is regularly occupied by a (continuously formed) Karman vortex street, so that the pressure fluctuations registered by means of the sensor 1 are periodic pressure fluctuations caused by vortices of opposite sense shed from the bluff body 4 with a shedding rate ($\sim 1/f_{Vtx}$) and the sensor signal s1 has a signal frequency ($\sim f_{Vtx}$) corresponding with the shedding rate of the vortices. In the example of an embodiment shown here, the vortex flow measuring device is additionally embodied as a measuring system in compact construction, in the case of which the measuring electronics 2 is accommodated in a protective housing 20 mounted on the tube, for example, by means of a neck shaped connection nozzle 30.

In an additional embodiment of the invention, the sensor 1 and the tube 3 are, furthermore, so dimensioned that a length l of the sensor blade 112, measured as the minimum separation between a proximal end of the sensor blade 112, namely an end adjoining the membrane, and a distal, (free) end of the sensor blade 112, namely an end remote from the membrane 111, or from its surface 111+, corresponds to greater than a half caliber DN of the tube 3, or less than 95% of the caliber DN. The length l can, for example, also be so selected—such as quite usual in the case of comparatively small calibers of less than 50 mm, or, as also evident from FIG. 2 that the distal end of the sensor blade 112 has only a very small, minimum separation from the wall 3* of the tube 3. In the case of tubes with comparatively large calibers of 50 mm or more, the sensor blade 112 can, such as quite usual in the case of measuring systems of the type being discussed, for example, also be embodied significantly shorter than a half caliber of the tube 3.

Figure 3A:
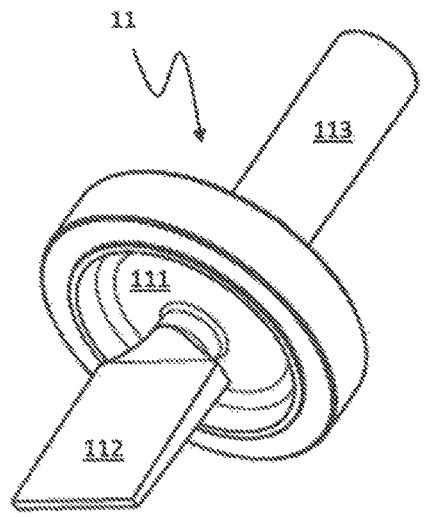
FIGS. 3a, and 3b, show schematically, equally as well, in each case, in a to scale manner, in different, partially also.
Figure 3B:
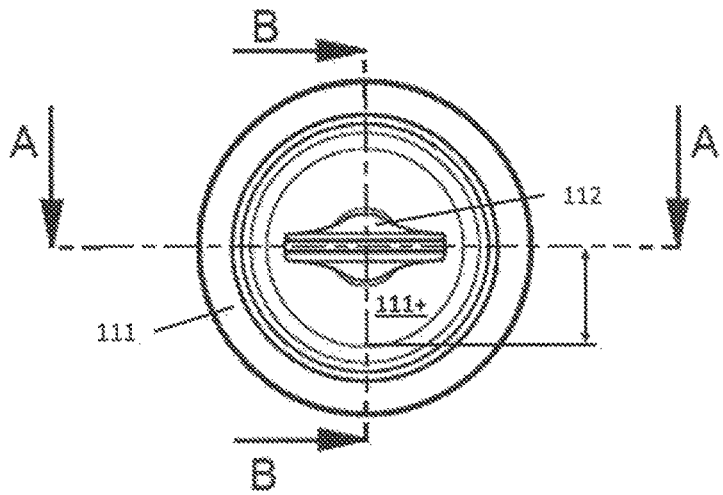
Figure 3C:
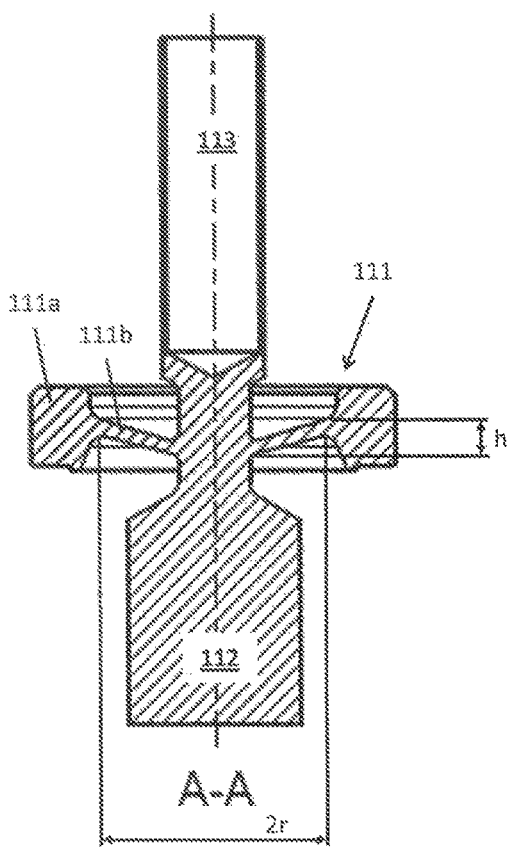
FIGS. 3c, and 3d show sectioned views, a sensor assembly for a sensor, especially suitable for use in a measuring system of FIG. 1, respectively 2.
Figure 3D:
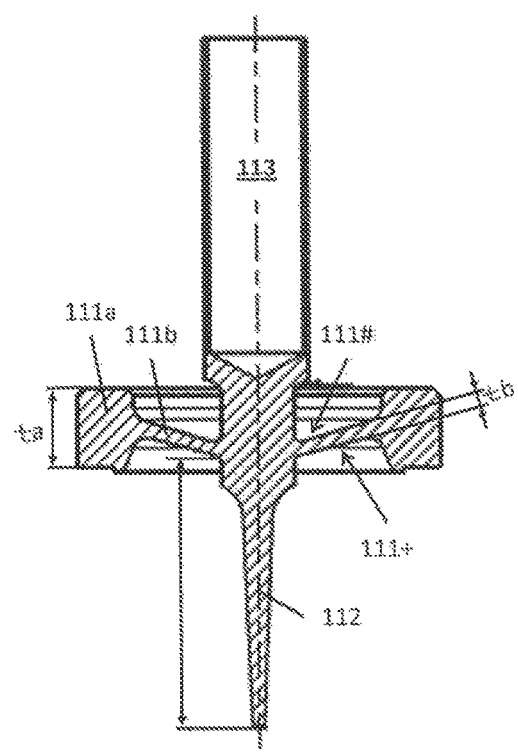

As already mentioned, the sensor assembly, consequently the sensor formed therewith, or the measuring system formed therewith, is especially provided to measure, or to be able to measure, at least at times, a fluid having a high temperature greater than 400° and a high pressure greater than 140 bar. In order to achieve a required correlation between pressure resistance and operating temperature (pressure temperature curve), the membrane of the sensor assembly of the invention is, as also shown schematically, in each case, in FIGS. 2, 3c, 3d, 4a, respectively 4b, embodied bowl shaped, namely at least sectionally bulged, in such a manner that the first surface 111+ of the membrane 111 is curved, wherein the membrane is so formed that, such as directly evident from the combination of FIGS. 2, 3c, 3d, 4a, 4b, at least the region of the surface 111+ adjoining the sensor blade 112 is convex. As schematically shown in FIGS. 2, 3c, 3d, the membrane 111 can, in such case, especially, be so formed that a second surface 111# lying opposite the surface 111+, namely in the case of sensor assembly 1 installed in the tube 3 facing away from the lumen 3*, extends—here at least partially likewise curved and/or at least partially concave—completely, or at least predominantly, parallel to the first surface 111+ and/or that a region of the second surface 111#, which lies opposite the convex region of the surface 111+ carrying the sensor blade, is concave; in case required, the membrane 111 can also be so formed that the surface 111# is partially, in given cases, predominantly or also completely, non parallel to the surface 111+, for example, in such a manner that the membrane 111 has in the radial direction, or along at least one lateral line, varying thicknesses.

Figure 5:
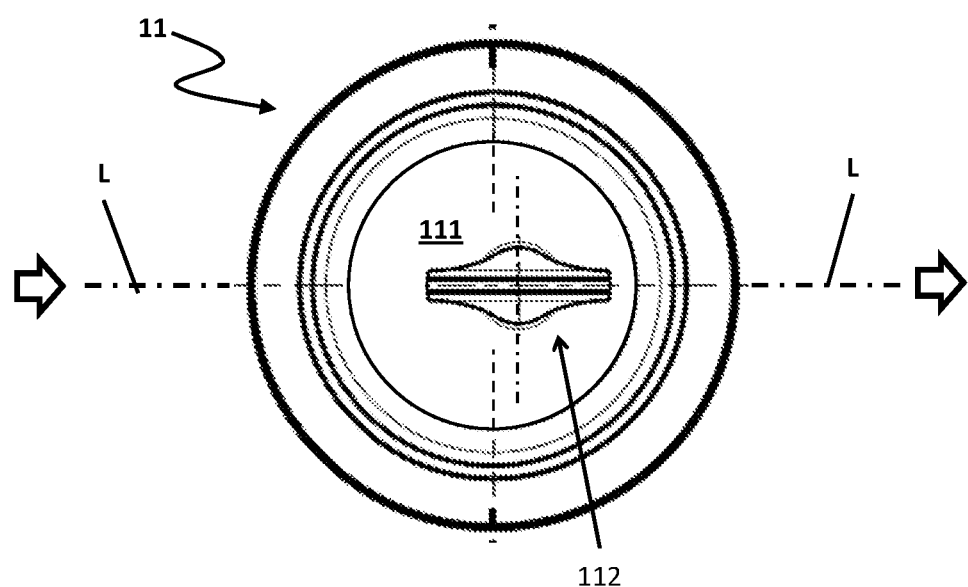
FIG. 5 shows schematically in plan view, another variant of a sensor assembly for a sensor, especially suitable for use in a measuring system of FIG. 1, respectively 2.

In an additional embodiment of the invention, the membrane is, furthermore, so formed that the region of the surface 111+ adjoining the sensor blade 112 is axially symmetric relative to at least one imaginary axis of symmetry. The symmetry axis can correspond, for example, to one of the cutting lines A, or B, shown in FIG. 3b. Furthermore, membrane 111 and sensor blade 112 can, in such case, be so embodied and oriented relative to one another that —, as well as also directly evident from a combination of FIGS. 3a, 3b, 3c and 3c the symmetry axis is parallel to a principle axis of inertia of the sensor blade and/or in such a manner that the symmetry axis is perpendicular to a principle axis of inertia of the sensor blade. Alternatively or supplementally, the sensor blade 112 and the membrane 111 can additionally be so positioned and oriented relative to one another that— as also directly evident from a combination of FIGS. 3a, 3b, 3c and 3c a lengthened principle axis of inertia of the membrane 111 coincides with a principle axis of inertia of the sensor blade 112 or that the lengthened principle axis of inertia of the membrane 111 extends parallel to the principle axis of inertia of the sensor blade 112, for example, also in such a manner that the lengthened principle axis of inertia of the sensor blade 112 extends parallel to, but separated from, the principle axis of inertia of the membrane 111, so that—as also indicated in FIG. 5 the principle axis of inertia of the sensor blade 112 does not coincide with the principle axis of inertia of the membrane 111. Sensor blade 112 and membrane 111 can additionally also be so positioned and oriented relative to one another that a lengthened principle axis of inertia of the sensor blade extends parallel to a principle axis of inertia of the sensor assembly, or coincides therewith, and/or that a principle axis of inertia of the membrane is parallel to, or coincides with, a principle axis of inertia of the sensor assembly 11.

In an additional embodiment of the invention, it is, furthermore, provided, or the membrane is so formed, that the region of the first surface 111+ adjoining the sensor blade 112 is axially symmetric relative to exactly two mutually perpendicular, imaginary axes of symmetry, for example, in such a manner that —, as well as also evident from a combination of FIG. 3a, 3b 3c, 3d at least one of the two axes of symmetry is parallel to a principle axis of inertia of the sensor blade and/or in such a manner that a principle axis of inertia of the sensor blade is perpendicular to one of the imaginary axes of symmetry and parallel to the other imaginary axis of symmetry.

Figure 4A:
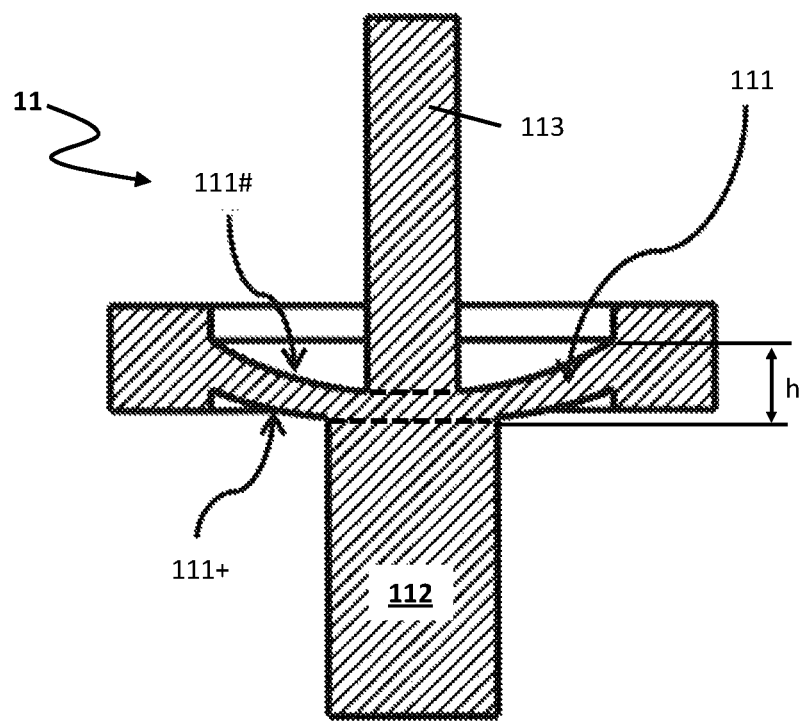
FIGS. 4a, and 4b show schematically in two different, sectioned, side views, another variant of a sensor assembly for a sensor, especially suitable for use in a measuring system of FIG. 1, respectively 2.
Figure 4B:
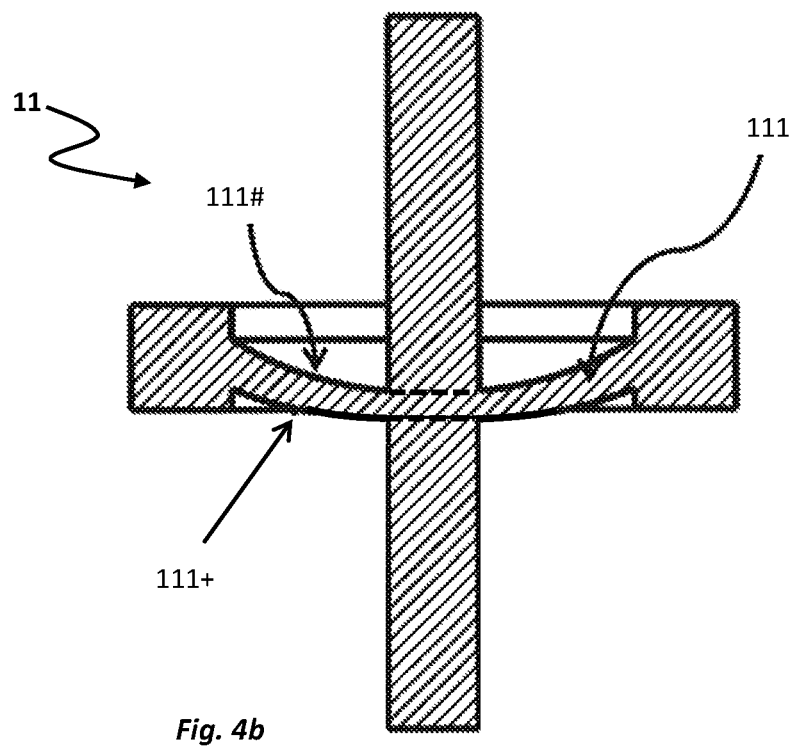

The membrane 111 is, according to an additional embodiment of the invention, so formed that at least the region of the surface 111+ adjoining the sensor blade 112 is rotationally symmetric. As directly evident from a combination of FIGS. 2, 3a, 3b 3c, 3d, the membrane 111 can, in such case, be developed e.g. at least partially conically, consequently the surface 111+, not least of all also its region adjoining the sensor blade, can at least partially correspond to a lateral surface of a frustum, for example, in such a manner that —, as also directly evident from FIG. 2, or 3c and 3d—an imaginary top area of the frustum corresponds to a cross sectional area of the sensor blade. Alternatively or supplementally, the membrane can, for example, also be so formed that—such as schematically shown in FIGS. 4a, 4b—its surface 111+, not least of all also its region adjoining the sensor blade, corresponds at least partially to a surface of a spherical zone, for example, in such a manner that—as also evident from FIGS. 4a and 4b, or their combination an imaginary top area of the spherical zone corresponds to a cross sectional area of the sensor blade, that thus at least the region of the first surface adjoining the sensor blade 111+ is spherically formed. Alternatively or supplementally, the membrane can, however, also be so formed that the surface 111+ is at least partially aspherical, for example, also its region adjoining the sensor blade.

Figure 6:
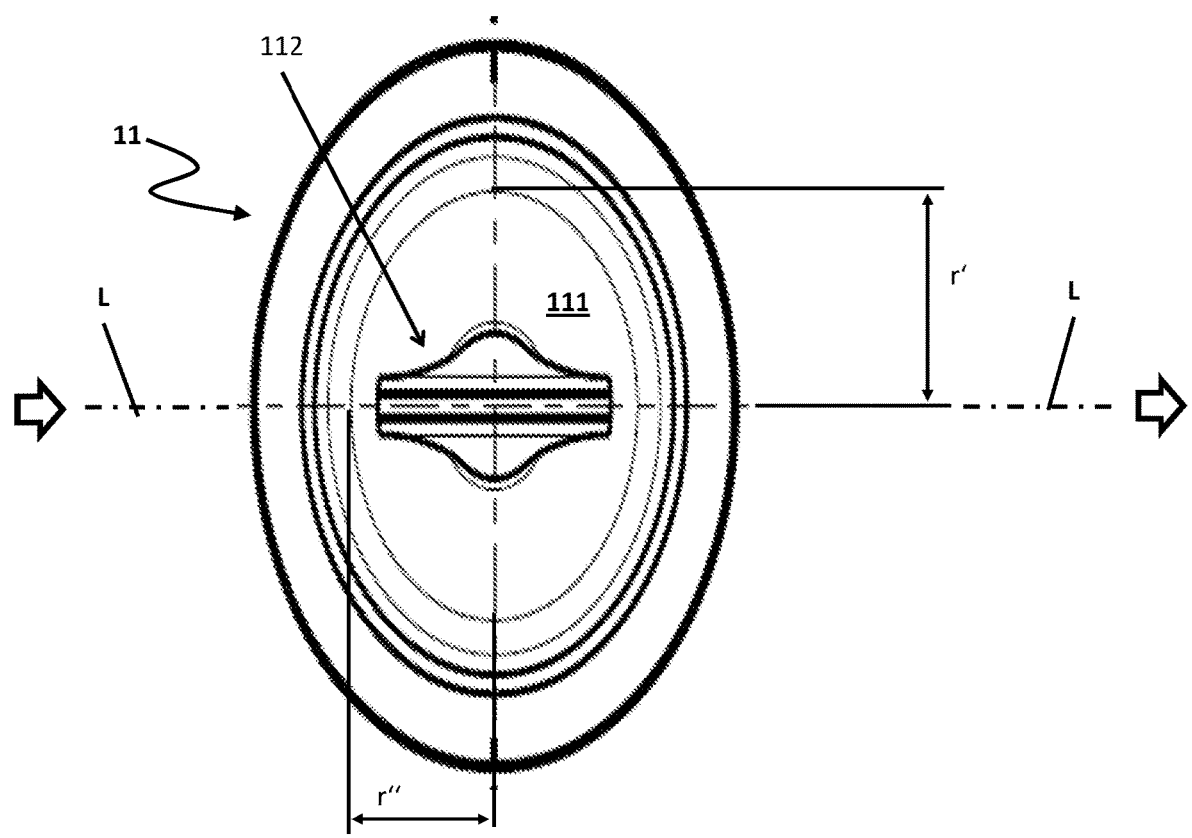
FIG. 6 shows schematically in plan view, another variant of a sensor assembly for a sensor, especially suitable for use in a measuring system according to FIG. 1, respectively 2.

The membrane, furthermore, can be, so formed that at least the segment 111b carrying the sensor blade 112, consequently the segment 111b forming the region of the first surface adjoining the sensor blade 111+, is rotationally symmetric, especially is embodied as a body of revolution having cylindrical symmetry. Alternatively, the membrane can, however, also be so formed, not least of all also for the purpose of an additional optimizing of measuring sensitivity and pressure resistance, that the first surface 111+ of the membrane, or its region adjoining the sensor blade 112, is not rotationally symmetric, for example, is only plane symmetric and/or, for example, corresponds to a segment of a surface of an ellipsoid; this, especially, in the manner that, as also shown in FIG. 6, or as is evident from a combination of FIG. 2 and FIG. 6, as a result, a greatest semi axis (r') of the ellipsoid corresponding to the shape of the region of the surface 111+ adjoining the sensor blade extends transversely to the longitudinal axis L of the tube 3 and a middle semi axis (r") of the ellipsoid extends parallel to the longitudinal axis L.

Since the membrane is formed in the previously indicated manner, namely embodied basically bowl shaped with convex surface 111+ at least in a region adjoining the sensor blade, it is possible in an easy and an equally as well very effective manner to achieve a drastic increase of the nominal pressure resistance, or a drastic improving of the dependence of the pressure resistance on the operating temperature, without in turn experiencing a sinking of measuring sensitivity, namely sensitivity of the sensor to the pressure fluctuations actually to be registered to an extent unacceptable for the high accuracy of measurement typically required, not least of all, also in industrial use. In an additional embodiment of the invention, the membrane is, especially, so formed that, as also directly evident from a combination of FIGS. 3a, 3b, 3c and 3d, a membrane height h, measured as a minimum separation of a center of area of the surface 111+ from an imaginary projected area inscribed by a peripheral (for example, also directly adjoining the above-mentioned edge segment 111a) outer edge of the region of the first surface adjoining the sensor blade is less than a membrane diameter 2r, measured as a greatest diameter of the projected area, especially less than a radius r, or in the case of an elliptical projected area, is less than a greatest semi axis r' of the projected area, for example, however, also less than a smallest semi axis r" of the projected area. A very good compromise between as high as possible pressure resistance, on the one hand, and as high as possible measuring sensitivity, on the other hand, can be achieved, for example, by forming the membrane such that a diameter to height ratio of the membrane (2r/h), defined as a ratio of the membrane diameter to the membrane height, is less than 30 and/or greater than 2, especially less than 20 and/or greater than 5. Alternatively or supplementally, the membrane 111 can, matched to the above-mentioned length l of the sensor blade 112, furthermore, be so dimensioned that a ratio of the membrane diameter 2r to the length l amounts to less than 2 and/or greater than 0.5.

For the purpose of an additional optimizing of measuring sensitivity and pressure resistance, the membrane 111 can, additionally, have, for example, also zones of different thickness. Therefore, the membrane 111 according to an additional embodiment of the invention is, furthermore, so embodied that the segment 111b carrying the sensor blade 112 has a first zone forming a center of the membrane with a first thickness and a second zone adjoining the first zone, especially surrounding it, with a second thickness different from the first thickness, for example, in such a manner that the first thickness is less than the second thickness, especially that the first thickness corresponds to the minimum thickness tb.

For compensating possible forces and/or moments resulting from movements of the sensor assembly, for instance, movements resulting from vibration of the connected pipeline, or for preventing undesired movements (namely movements corrupting the sensor signal s1) of the sensor blade, or the membrane, resulting therefrom, the sensor assembly 11 includes, according to an additional embodiment of the invention, furthermore, a compensating body 113, for example, a rod-, plate- or sleeve-shaped, compensating body 113, extending from the second surface 111# of the membrane 111. The compensating body 113 can additionally also serve as a mount for the transducer element 12 or also as a component of the transducer element 12, for example, as a movable electrode of a capacitor forming the (capacitive) transducer element. In an additional embodiment, the membrane is, furthermore, so formed, or the compensating body is so positioned, that at least one region of the second surface 111# adjoining the compensating body 113 is concave and/or rotationally symmetric, especially extends parallel to the region of the first surface adjoining the sensor blade 111+.

The compensating body 113 can, for example, be of the same material as the membrane and/or as the sensor blade, for example, a metal. For example, the compensating body 113 can namely be produced of a stainless steel, respectively a nickel based alloy. In an additional embodiment of the invention, membrane 111 and compensating body 113 are connected with one another by material bonding, for example, welded, or soldered or brazed. Consequently, it is provided that compensating body 113 and membrane 111 are manufactured from materials connectable with one another by material bonding. Alternatively, membrane 111 and compensating body 113 can, however, also be components of one and the same, monolithic, molded part, for example, also in such a manner that sensor blade 111, membrane 112 and compensating body 113 are components of the molded part.

Sensor blade 112 and compensating body 113 can, furthermore, as also evident from a combination of FIGS. 3c and 3d, or a combination of FIGS. 4a and 4b, be arranged aligned with one another, in such a manner that a lengthened principle axis of inertia of the sensor blade 112 coincides with a principle axis of inertia of the compensating body 113. Alternatively or supplementally, the compensating body 113 and the membrane 111 can additionally be so positioned and oriented relative to one another that a lengthened principle axis of inertia of the membrane 111 coincides with a principle axis of inertia of the compensating body 113 or also such that the lengthened principle axis of inertia of the membrane 111 extends parallel to the principle axis of inertia of the compensating body 113; this, for example, also in such a manner that sensor blade 112 and compensating body 113 align with one another in the previously indicated manner, however, both the lengthened principle axis of inertia of the compensating body as well as also the lengthened principle axis of inertia of the sensor blade extend parallel to but spaced from the principle axis of inertia of the membrane, so that thus not only the principle axis of inertia of the sensor blade 112—such as, for example, also shown in FIG. 5, but, instead, also the principle axis of inertia of the compensating body 113 do not coincide with the principle axis of inertia of the membrane 111. Moreover, sensor blade 112, compensating body 113 and membrane 111 can also be so positioned and oriented relative to one another that—as evident, for example, also from a combination of FIGS. 2, 3a, 3b, 3c and 3d a principle axis of inertia of the sensor assembly 11 is parallel both to a principle axis of inertia of the sensor blade 112 as well as also to a principle axis of inertia of the compensating body 113, as well as also to a principle axis of inertia of the membrane 111 or coincides both with the principle axis of inertia of the sensor blade as well as also with the principle axis of inertia of the compensating body, as well as also with the principle axis of inertia of the membrane.

The invention claimed is:

1. A sensor assembly, comprising:
   a bowl shaped, namely at least sectionally dished, membrane, with a curved, first surface and an oppositely lying, second surface; and
   a sensor blade extending from said first surface of said membrane, wherein:
   said membrane is so formed that at least one region of said first surface adjoining said sensor blade is convex and corresponds to a surface of a spherical zone.

2. The sensor assembly as claimed in claim 1, wherein:
   said membrane is so formed that a top area of said spherical zone corresponds to a cross sectional area of said senor blade.

* * * * *